United States Patent
Annapragada

(10) Patent No.: US 8,612,999 B2
(45) Date of Patent: Dec. 17, 2013

(54) SYSTEM, METHOD AND COMPUTER PROGRAM PRODUCT FOR PUBLISHING AN APPLICATION-INDEPENDENT FORMAT EVENT

(75) Inventor: Sri Vidya Annapragada, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 150 days.

(21) Appl. No.: 13/214,113

(22) Filed: Aug. 19, 2011

(65) Prior Publication Data

US 2012/0047520 A1 Feb. 23, 2012

Related U.S. Application Data

(60) Provisional application No. 61/375,418, filed on Aug. 20, 2010.

(51) Int. Cl.
*G06F 13/00* (2006.01)
(52) U.S. Cl.
USPC ......................................................... 719/318
(58) Field of Classification Search
USPC ......................................................... 719/318
See application file for complete search history.

(56) References Cited

U.S. PATENT DOCUMENTS

| | | | |
|---|---|---|---|
| 7,209,929 B2 | 4/2007 | Dominguez, Jr. et al. | |
| 7,698,160 B2 | 4/2010 | Beaven et al. | |
| 8,005,680 B2 * | 8/2011 | Kommer | 704/275 |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 2003/0233404 A1 | 12/2003 | Hopkins | |
| 2004/0225958 A1 * | 11/2004 | Halpert et al. | 715/513 |
| 2005/0065925 A1 | 3/2005 | Weissman et al. | |
| 2005/0125462 A1 * | 6/2005 | Lara et al. | 707/203 |
| 2005/0223022 A1 | 10/2005 | Weissman et al. | |
| 2005/0283478 A1 | 12/2005 | Choi et al. | |
| 2006/0206834 A1 | 9/2006 | Fisher et al. | |
| 2006/0259909 A1 * | 11/2006 | Passero et al. | 719/312 |
| 2008/0294794 A1 * | 11/2008 | Darugar et al. | 709/238 |
| 2010/0159961 A1 * | 6/2010 | Bowman et al. | 455/466 |

OTHER PUBLICATIONS

U.S. Appl. No. 60/828,192, filed Oct. 4, 2006.

* cited by examiner

*Primary Examiner* — Andy Ho
(74) *Attorney, Agent, or Firm* — Zlika-Kotab, PC

(57) ABSTRACT

In accordance with embodiments, there are provided mechanisms and methods for publishing an application-independent format event. These mechanisms and methods for publishing an application-independent format event can enable optimized data communication, improved scalability, increased operational efficiency, etc.

21 Claims, 4 Drawing Sheets

SYSTEM, METHOD AND COMPUTER PROGRAM PRODUCT FOR PUBLISHING AN APPLICATION-INDEPENDENT FORMAT EVENT

CLAIM OF PRIORITY

This application claims the benefit of U.S. Provisional Patent Application 61/375,418, entitled "Methods and Systems for Event-Based Loosely Coupled Integration of Cloud Computing Applications," by Sri Vidya Annapragada, filed Aug. 20, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to system integration, and more particularly to integrating distributed systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Many modern business processes involve interactions between multiple applications and information sources. For example, a business process may interact with multiple cloud-based and on-premise applications and information sources. Unfortunately, techniques for enabling communication between such applications and information sources have been associated with various limitations.

Just by way of example, traditional methods of integration between multiple applications and information sources may not ensure real-time information exchange and may not support an exponential growth of systems, data, etc. Accordingly, it is desirable to provide techniques that improve the integration of distributed systems.

BRIEF SUMMARY

In accordance with embodiments, there are provided mechanisms and methods for publishing an application-independent format event. These mechanisms and methods for publishing an application-independent format event can enable optimized data communication, improved scalability, increased operational efficiency, etc.

In an embodiment and by way of example, a method for publishing an application-independent format event is provided. In one embodiment, an event associated with a first application is identified. Additionally, the event is converted into an application-independent format event. Further, the application-independent format event is published.

While one or more implementations and techniques are described with reference to an embodiment in which publishing an application-independent format event is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are pr vided for publishing an application-independent format event.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for publishing an application-independent format event will be described with reference to example embodiments.

Figure 1:
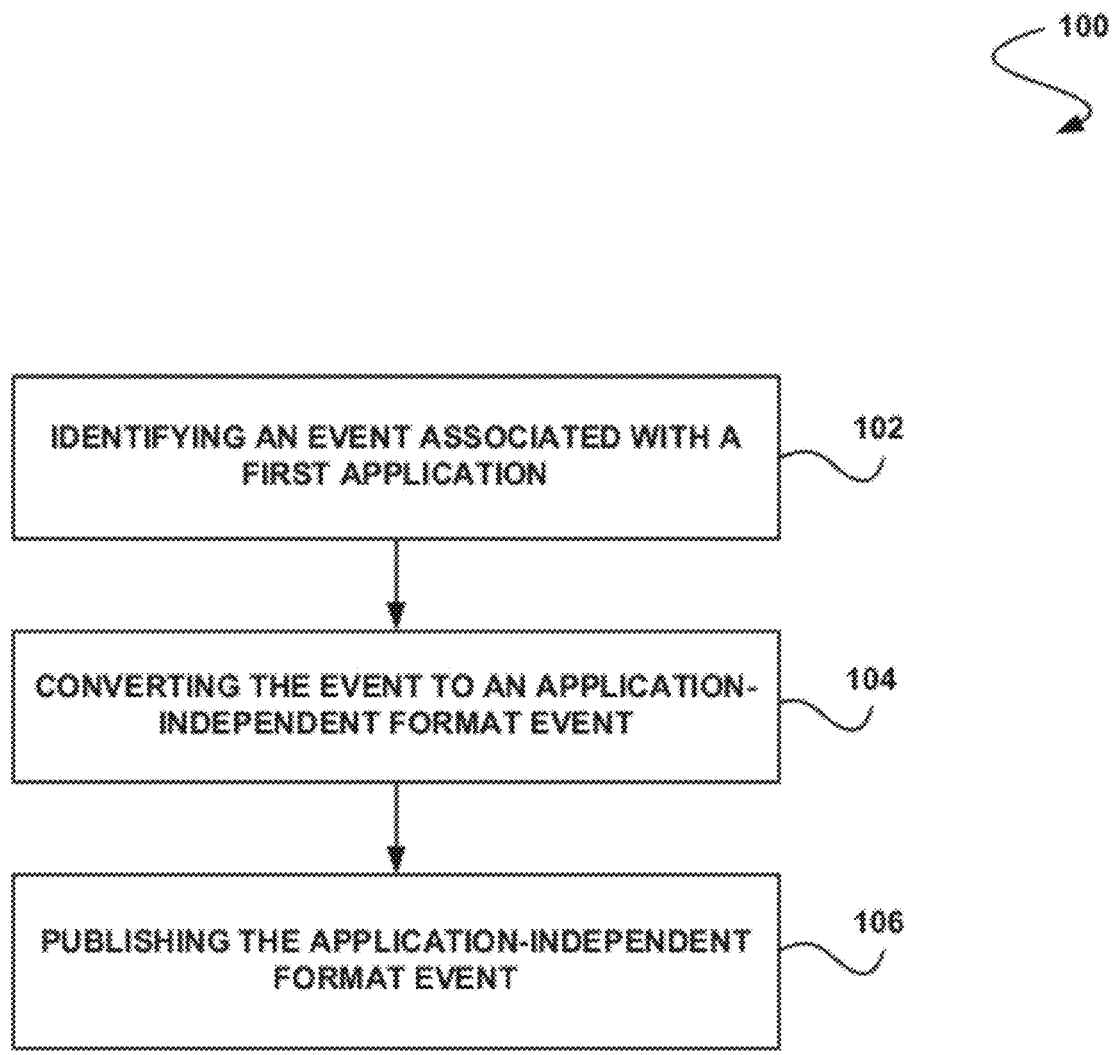
FIG. 1 illustrates a method for publishing an application-Independent format event, in accordance with one embodiment.

FIG. 1 illustrates a method 100 for publishing an application-independent format event, in accordance with one embodiment. As shown in operation 102, an event associated with a first application is identified. In one embodiment, the event may be associated with an action performed by the first application. For example, the event may include a notification that the first application performed a particular action. In another embodiment, the event may include one or more details of the action performed by the first application. For example, the event may include a summary of the action performed by the application. In yet another embodiment, the event may include data associated with the action performed by the first application. For example, the event may include data that has been altered, updated, deleted, etc. by the first application. In another embodiment, the event may be formatted as a message.

Additionally, in one embodiment, an application (e.g., the first application, etc.) may include any program capable of performing one or more actions on data. For example, the application may include a directory application, a calendar application, a word processing application, etc. another embodiment, the application may be associated with a multi-tenant on-demand database system. For example, the application may be included within (and may be managed by) a multi-tenant on-demand database system. In another example, the application may include a cloud-based application (e.g., an application supported by (and operable within) a cloud computing environment, etc.). In another example, the application may include an on-premise application. For instance, the application may include an application installed within a server, a personal computer, a mobile computing device, etc.

Additionally, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Further, as shown in operation 104, the event is converted into an application-independent format event. In one embodiment, the event may initially be in an application-specific format, and converting the event may include altering one or more application-specific portions of the event. For example, application-specific portions of the event may include one or more portions of the event that that are specific to the first application. For example, the application-specific portions of the event may include one or more of the contents of the event, a data type of the event, one or more details of the event, etc.

Further still, in one embodiment, converting the event may include changing one or more application-specific portions of the event to be application-independent (e.g., not specific to a particular application, etc.). For example, one or more portions of the event that are identified and utilized by a particular application or subset of applications may be converted such that they may be identified and utilized by a larger number of applications (e.g., all applications supported by a multi-tenant on-demand database system, etc.). Also, in another embodiment, the event may be converted by a particular entity. For example, a listener (e.g., a notification listener, etc.) may perform both the identifying of the event and the converting of the event to the application-independent format.

Also, as shown in operation 106, the application-independent format event is published. In one embodiment, the application-independent format event may be published utilizing a bus. For example, the application-independent format event may be broadcast on or otherwise transmitted to a bus. In another example, the bus may include any type of communications bus by which data is made available to a plurality of entities. For example, the bus may include a message bus, a data transfer bus, a notification bus, an enterprise service bus, etc.

In addition, in one embodiment, a plurality of subscribers may be associated with the bus. In another embodiment, the plurality of subscribers may include one or more applications within the multi-tenant on-demand database system. For example, the plurality of subscribers may include the first application as well as a plurality of additional applications other than the first application. In another example, the plurality of subscribers may include one or more entities situated between (and separate from) the bus and one or more applications that manage the transfer of events between the bus and the applications.

Further, in one embodiment, the plurality of subscribers may be in communication with the bus. For example, one or more of the plurality of subscribers may listen to the bus (e.g., in order to detect events published to the bus, etc.). In another embodiment, one or more subscribers listening to the bus may retrieve the published application-independent format event. For example, one or more of the subscribers may detect the published event and may consume the event by registering with the bus. In yet another embodiment, the bus may filter one or more events and may only deliver events to one or more predetermined subscribers.

Further, in one embodiment, the published application-independent format event may be retrieved by one or more of the subscribers by sending the event to the subscribers from the bus. In another embodiment, one or more of the subscribers may retrieve the published application-independent format event and may forward the event on to another entity (e.g., another application other than the first application, etc.). In another embodiment, the published application-independent format event may be converted from its application-independent format to a format specific to an application other than the first application when the event is retrieved. For example, the published application-independent format event may be converted into a format understandable by an application that is intended to receive the event (e.g., an application other than the first application, etc.). In yet another embodiment, the published application-independent format event may be converted by the subscriber that retrieves the event, by the bus, etc.

Further still, in one embodiment, the retrieved and converted event may be forwarded on to another entity. For example, the retrieved event may be converted to a format associated with (e.g., understandable by) a destination application by the one or more subscribers and may be forwarded on to the destination application by the one or more subscribers. In another embodiment, the retrieved and converted event may be processed by the destination application. For example, the destination application may incorporate one or more changes described in the event into the destination application. In this way, applications may communicate events via the bus in real time. Additionally, the bus may provide service virtualization that may provide a loosely coupled integration between applications.

Figure 2:
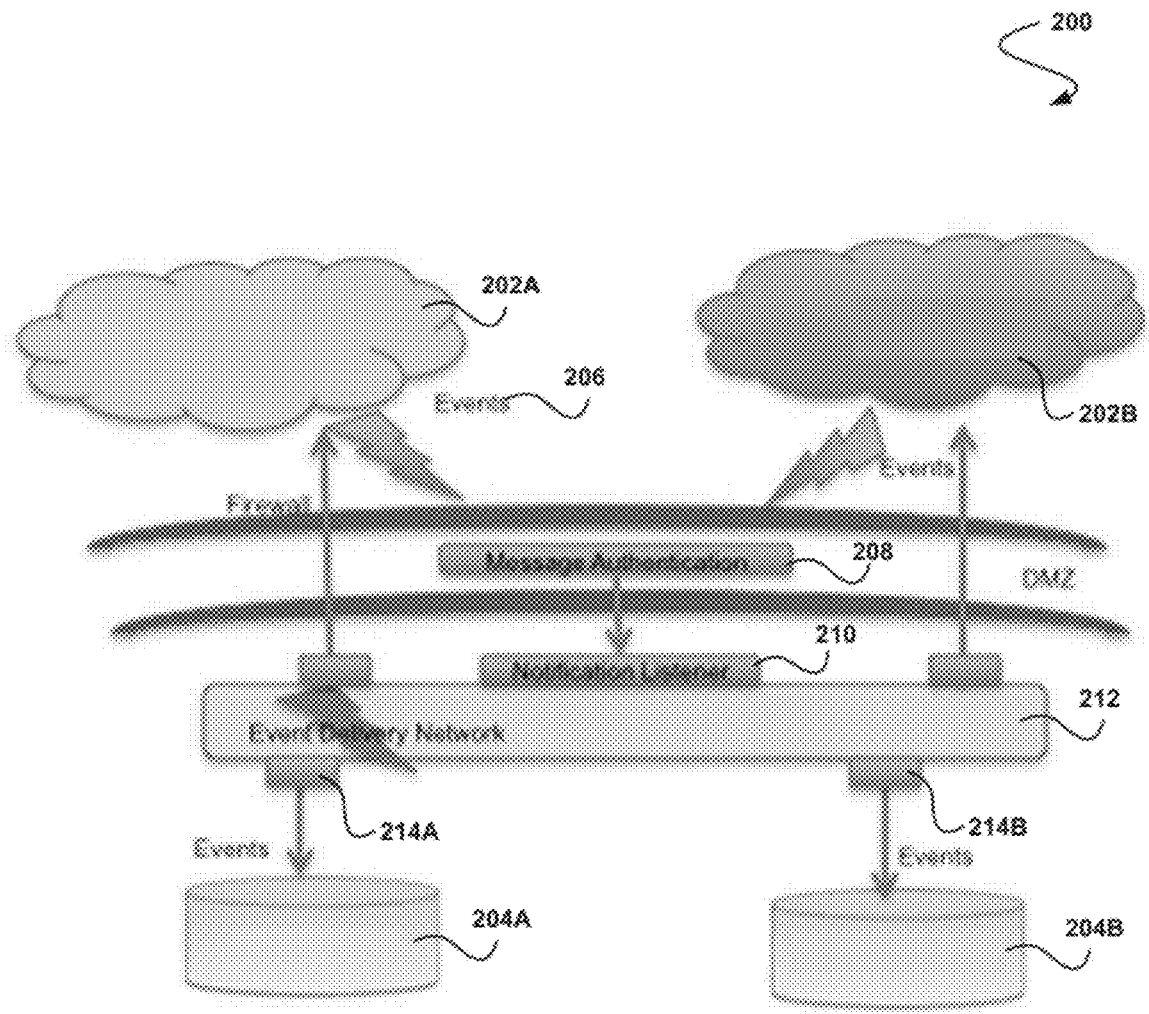
FIG. 2 illustrates an exemplary event-based loosely coupled integration system, in accordance with another embodiment.

FIG. 2 illustrates an exemplary event-based loosely coupled integration system 200, in accordance with another embodiment. As an option, the present system 200 may be carried out in the context of the functionality of FIG. 1. Of course, however, the system 200 may be carried out in any desired environment. The aforementioned definitions may apply during the present description.

As shown, the integration system 200 includes cloud-based applications 202A and 202B, as well as on-premise applications 204A and 204B. Additionally, cloud-based application 202A is a source of truth for a record (e.g., an employee record, a financial record, a customer record, etc.). For example, when a change is detected in the record at the cloud-based application 202A, an event 206 (e.g., an outbound event, etc.) is triggered. Additionally, the cloud-based application 202A sends the event 206 to a message authentication module 208, where the event is authenticated and forwarded on to a notification listener 210. In one embodiment, the notification listener 210 may be configured in an integration layer of the system 200.

Further, the notification listener 210 converts the event 206 from the cloud-based application 202A to an application-independent format. Further still, the notification listener 210 publishes the application-independent format event to a bus 212 (e.g., an enterprise service bus, etc.). Also, event subscribers 214A and 214B associated with the cloud-based applications 202A and 202B, respectively, listen to the events published on the bus 212. In one embodiment, the bus 212 may be configured to filter the events and deliver them only to relevant subscribers. For example, applications and their relative subscribers may consume an event they are interested in by registering with the bus 211.

In addition, the event subscribers 214A and 214B consume (e.g., retrieve, etc.) the application-independent format event from the bus 212. In one embodiment, the event subscribers 214A and 214B may transform the application-independent format event into an application-understandable format event. For example, the event subscribers 214A and 214B may transform the application-independent format event into a format understandable by cloud-based applications 202A and 202B, respectively.

Further, the event subscribers 214A and 214B then send the application-understandable format event to their respective cloud-based applications 202A and 202B. In one embodiment, the cloud-based applications 202A and 202B may then process the application-understandable format event. For example, the cloud-based applications 202A and 202B may incorporate changes described in the application-understandable format event into their application infrastructure. In another embodiment, message sharing between the cloud-based applications 202A and 202B and the on-premise applications 204A and 204B may occur via events published by the bus 212.

In this way, applications may communicate and interact in real time, thereby increasing operational efficiency. Additionally, integration may be loosely coupled using service virtualization. Further, integration may be event-based by using events which may allow for real-time synchronization of data among systems. Further still, loosely coupled integration may help reduce the impact on an integration ecosystem (e.g., when applications undergo updates, when new applications are added, etc.). This combination of event-based operation and loosely coupled design may provide a complete solution for integrating distributed systems, and may support an exponential growth of systems and data.

System Overview

Figure 3:
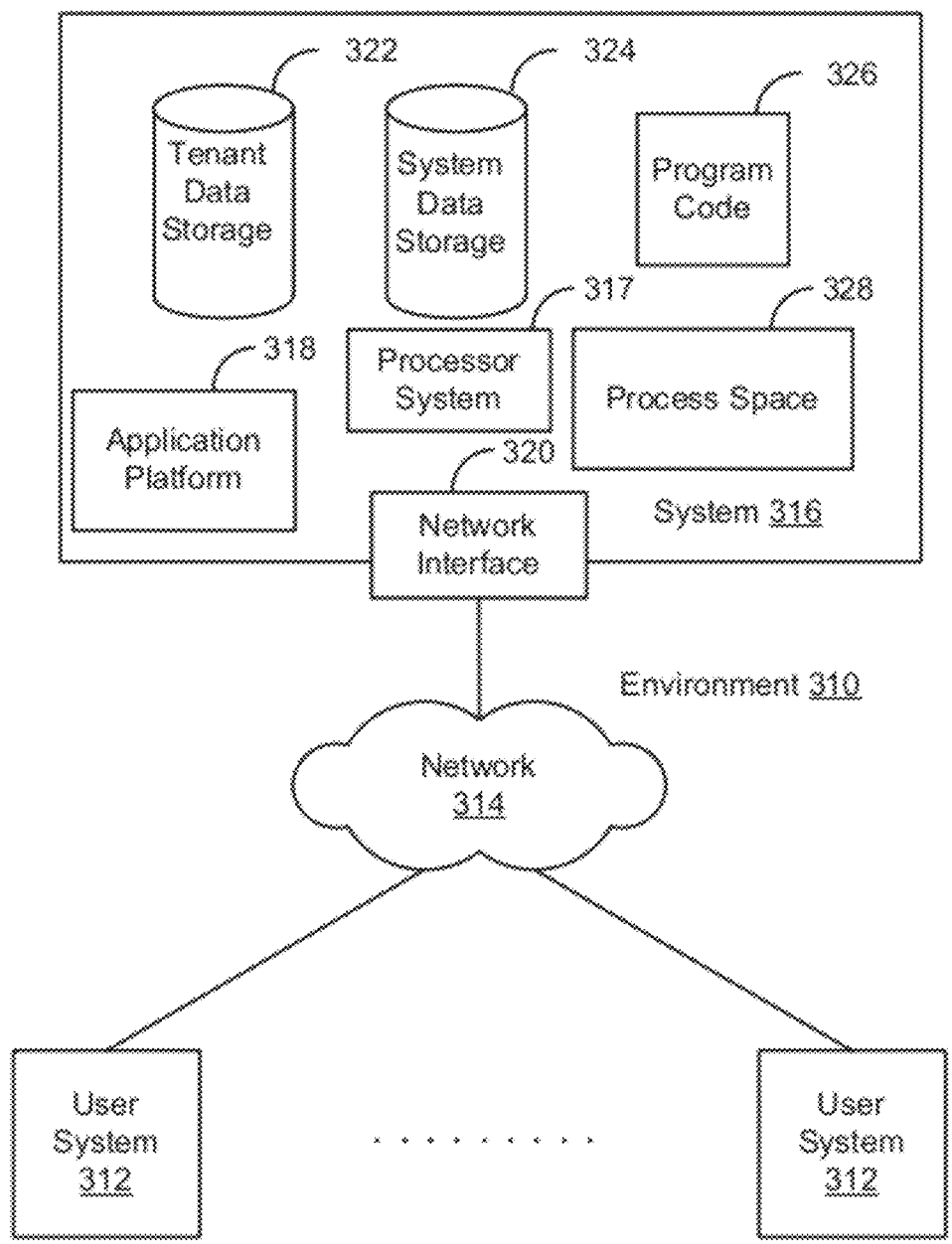
FIG. 3 illustrates a block diagram of an example of an environment wherein an on-demand database system might be used.

FIG. 3 illustrates a block diagram of an environment 310 wherein an on-demand database system might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database system exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database system, which is system 316.

An on-demand database system, such as system 316, is a database system that is made available to outside users that do not need to necessarily be concerned with building and/or maintaining the database system, hut instead may be available for their use when the users need the database system (e.g., on the demand of the users). Some on-demand database systems may store information from one or more tenants stored into tables of a common database image to form a multi-tenant database system (MTS). Accordingly, "on-demand database system 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database system 316 may include an application platform 318 that enables creation, managing and executing one or more applications developed by the provider of the on-demand database system, users accessing the on-demand database system via user systems 312, or third party application developers accessing the on-demand database system via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application (s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
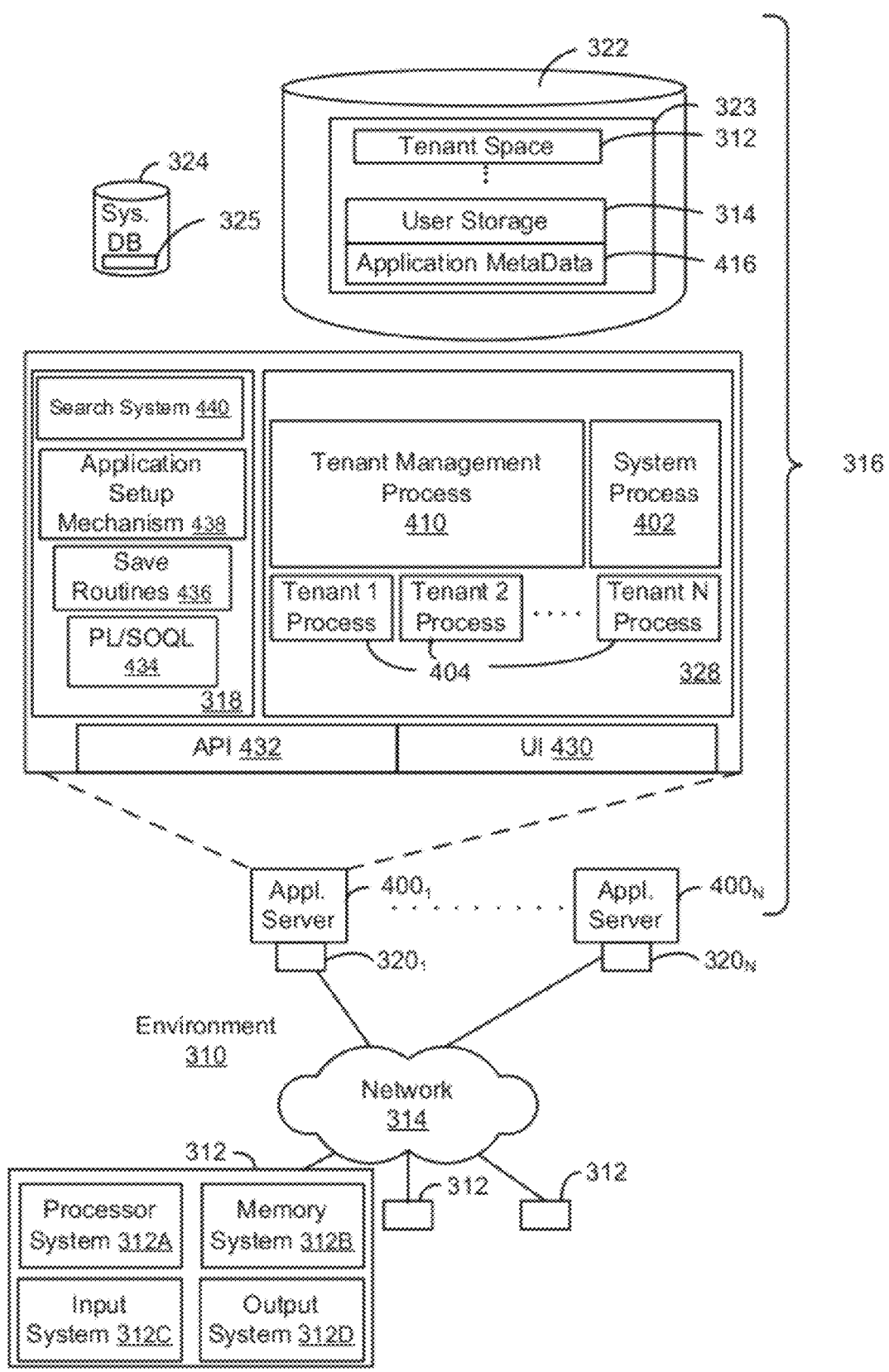
FIG. 4 illustrates a block diagram of an embodiment of elements of FIG. 4 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 31213, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product embodied on a machine-readable storage medium, comprising:
computer code for identifying an event associated with a first application, where the event includes a notification that the first application performed a particular action;
computer code for converting the event into an application-independent format event; and
computer code for publishing the application-independent format event;
wherein the computer program product is operable such that the application-independent format event is converted to a format associated with a destination application and is forwarded on to a destination application, where the application-independent format event describes changes to be made to an application infrastructure, and where the destination application incorporates the described changes into an infrastructure of the destination application.

2. The computer program product of claim 1, wherein the event includes one or more details of the action performed by the first application.

3. The computer program product of claim 1, wherein the event is initially in an application-specific format, and converting the event includes altering one or more application-specific portions of the event.

4. The computer program product of claim 1, wherein converting the event includes changing one or more application-specific portions of the event to be application-independent.

5. The computer program product of claim 1, wherein the application-independent format event is published utilizing a bus.

6. The computer program product of claim 5, wherein the application-independent format event is broadcast on the bus.

7. The computer program product of claim 5, wherein a plurality of subscribers are associated with the bus.

8. The computer program product of claim 7, wherein the plurality of subscribers include one or more entities situated between the bus and one or more applications that manage the transfer of events between the bus and the applications.

9. The computer program product of claim 7, wherein the plurality of subscribers are in communication with the bus.

10. The computer program product of claim 7, wherein the computer program product is operable such that one or more subscribers listening to the bus retrieve the published application-independent format event.

11. The computer program product of claim 1, wherein the computer program product is operable such that the published application-independent format event is converted by a subscriber that retrieves the event.

12. The computer program product of claim 10, wherein the computer program product is operable such that the retrieved and converted event is processed by the destination application.

13. The computer program product of claim 5, wherein the bus filters one or more events and may only deliver events to one or more predetermined subscribers.

14. The computer program product of claim 1, wherein one or more subscribers retrieve the published application-independent format event and forward the event on to another entity.

15. The computer program product of claim 14, wherein the other entity includes another application other than the first application.

16. The computer program product of claim 1, wherein the published application-independent format event is converted from its application-independent format to a format specific to an application other than the first application when the event is retrieved.

17. The computer program product of claim 1, wherein the published application-independent format event is converted into a format understandable by an application that is intended to receive the event.

18. The computer program product of claim 1, wherein the event includes an indication of a change in a record.

19. A method, comprising:
identifying an event associated with a first application, where the event includes a notification that the first application performed a particular action;
converting the event into an application-independent format event, utilizing a processor; and
publishing the application-independent format event;
wherein the application-independent format event is converted to a format associated with a destination application and is forwarded on to a destination application, where the application-independent format event describes changes to be made to an application infrastructure, and where the destination application incorporates the described changes into an infrastructure of the destination application.

20. An apparatus, comprising:
a processor for:
identifying an event associated with a first application, where the event includes a notification that the first application performed a particular action;
converting the event into an application-independent format event; and
publishing the application-independent format event;
wherein the apparatus is operable such that the application-independent format event is converted to a format associated with a destination application and is forwarded on to a destination application, where the application-independent format event describes changes to be made to an application infrastructure, and where the destination application incorporates the described changes into an infrastructure of the destination application.

21. A method for transmitting code for use in a multi-tenant database system on a transmission medium, the method comprising:
transmitting code for identifying an event associated with a first application, where the event includes a notification that the first application performed a particular action;
transmitting code for converting the event into an application-independent format event; and
transmitting code for publishing the application-independent format event;
wherein the application-independent format event is converted to a format associated with a destination application and is forwarded on to a destination application, where the application-independent format event describes changes to be made to an application infrastructure, and where the destination application incorporates the described changes into an infrastructure of the destination application.

* * * * *